United States Patent [19]

Yuen

[11] 4,152,541

[45] May 1, 1979

[54] FULL DUPLEX DRIVER/RECEIVER

[75] Inventor: Raymond C. Yuen, Poway, Calif.

[73] Assignee: Burroughs Corporation, Detroit, Mich.

[21] Appl. No.: 874,866

[22] Filed: Feb. 3, 1978

[51] Int. Cl.² .............................................. H04L 5/14
[52] U.S. Cl. .................................................... 178/59
[58] Field of Search ........................ 178/49, 58, 59, 60, 178/70 R, 71, 73, 70 TS; 307/237, 355, 356, 357, 358; 328/135; 325/38 A; 179/1 C, 2 C, 3, 4, 170 E

[56] References Cited

U.S. PATENT DOCUMENTS

| 3,566,031 | 2/1971 | Carbone et al. | 178/59 |
| 3,983,324 | 9/1976 | Lacher | 178/59 |

Primary Examiner—Thomas A. Robinson
Attorney, Agent, or Firm—Joseph R. Dwyer; Mervyn L. Young; Kevin R. Peterson

[57] ABSTRACT

A duplex driver/receiver module having circuitry which permits the sending and receiving of data from an identical module simultaneously, utilizing resistive and gating techniques to overcome differential noise, to accommodate circuit manufacture process variations and transmission line resistances within the CML logic environment.

8 Claims, 1 Drawing Figure

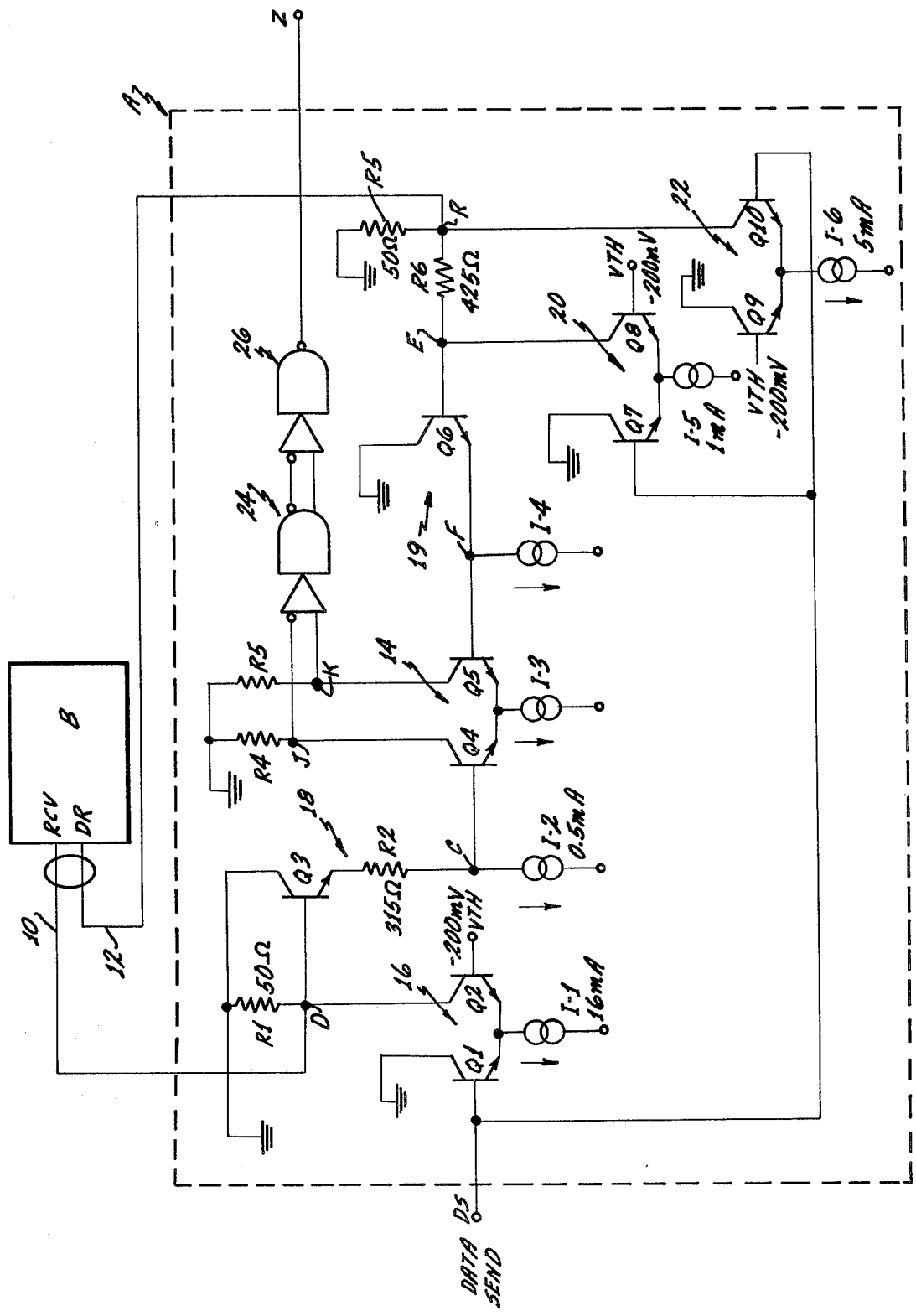

FULL DUPLEX DRIVER/RECEIVER

BACKGROUND OF THE INVENTION

This invention relates to duplex driver/receiver modules containing circuitry which permits the modules to transmit and receive data concurrently and is particularly desirable since it operates in CML logic environment.

To be able to provide a fully duplex driver/receiver circuitry, which can drive and receive at the same time, is obviously desirable but quite difficult to build in order to meet the input level requirements of a CML logic environment. The logic voltage swings are designed to be relatively narrow, typically, 0.0 V to −400 mV, yet the circuitry must reject errors introduced into the logic voltage swings due to differential mode noise, as well as variations in the process of manufacture of the components of the module and variations in the voltage levels of the power supply regulators supplying the voltage and current to the modules. Thus, the actual voltage could be −40 mV≦HIGH ≦0.0 V and −500 mV≦LOW≦−300 mV, which also means that I max/-min= ±25% of I typical where I typical is designed to current source value. It is possible, taking worst case conditions, that while the data being sent is a logical HIGH and the data being received is a logical LOW, actually the signal voltage level on the input to the module may be higher than the logical HIGH being sent and the circuit must be capable of translating this logical LOW so that the module output to other circuitry is a logical LOW to correspond with the logical LOW being received.

SUMMARY OF THE INVENTION

The duplex driver/receiver circuitry which overcomes the difficulties, hereinabove mentioned, comprises a comparator gate to which is connected the DATA SEND input node and a driver node through a voltage level shifter so as to present the true HIGHs and LOWs to one side of the comparator gate. On the other hand, the receiver node, while being connected to the other side of the comparator gate through a voltage level shifter, is also provided with a pair of gates which respond to the HIGHs and LOWs on the DATA SEND node to accommodate the reception of HIGHs and LOWs on the receiver node while HIGHs and LOWs are being sent from the module so that true HIGHs and LOWs are sent to the other side of the comparator gate. Thus, the output from the module will coincide logically with the data being received.

BRIEF DESCRIPTION OF THE DRAWING

The sole FIGURE herein is a detailed schematic circuit diagram of one duplex driver/receiver embodying the invention coupled by cable to an identical duplex driver/receiver.

BRIEF DESCRIPTION OF THE PREFERRED EMBODIMENT

Before describing the preferred embodiment of this invention in detail, it is pointed out that in order to have a clearer understanding of the operation of this invention, certain resistance, voltage, and current values will be given which are exemplary only, and these values may vary according to the needs of those skilled in the art in practicing the inventive concept herein.

In the sole FIGURE there is shown a circuit for integrated circuit chip module A which is one duplex driver/receiver which communicates by cable comprising conductor lines 10 and 12 to an identical duplex/receiver module B.

Since modules A and B are identical, only module A will be described, and it can be seen that there is a DATA SEND node DS which receives input data from other circuitry and is coupled to a drive output node D which in turn is connected to module B by line 10. At the other end of module A is DATA RECEIVE node R connected to module B by line 12 and coupled ultimately to node Z, the output from module A. The circuitry accommodates logical HIGHs and LOWs being received at the DATA SEND node DS, the input to module A, and sent through the drive output node D to module B and accommodates logical HIGHs and LOWs being received at the same time from module B on the DATA RECEIVE node R and communicated to the output node Z.

The logical input signal at node R, being received from module B, however, may vary from the true CML logical HIGHs and LOWs (0.0 V to −400 mV) due to cable resistance in lines 10 and 12, to differential noise and to process variations in the manufacture of modules A and B as well as to variations in voltages from the voltage regulator supplying the voltages to modules A and B; but nonetheless, the output on node Z must be logically the same as input at node R for the module to function correctly. Thus, comparator gate 14, which supplies the output logic signals to node Z, must follow the logic signals received at node R whether or not the signals at node DS are at a logical HIGH or LOW and whether or not the signal received at node R varies from the voltage levels of the conventional CML logical HIGHs and LOWs. It should be noted at this point again, that while a logical HIGH is desirably 0.0 V and a logical LOW is desirably −400 mV, actual values for HIGHs can be −40 mV ≦HIGH≦0.0 V and LOWs can be −500 mV≦LOW≦ −300 mV. Too, it should be remembered that the HIGHs and LOWs at node DS can vary 25% due to process variations.

Thus, driver output node D is connected through a CML gate 16 and a voltage level shifter 18 to the comparator gate 14, and likewise node R is connected through a second voltage level shifter 19 to the comparator gate 14. In addition, node R is also connected to two CML gates 20 and 22 which are in turn connected to node DS to accommodate the data being received on node DS at the same time node R is receiving data from the module B.

Before describing the operation of the module A, the circuit thereof will be first described in detail.

Node DS is connected to the base of transistor Q1 of CML gate 16, while its emitter is connected in current steering relationship to the emitter of transistor Q2 and to a regulated current source I-1 of 16 mA. The base of transistor Q2 is connected to a threshold voltage source VTH, the voltage level (−200 mV) of which is selected to be midway of the voltage swings on the base of transistor Q1 so that the current from the current source I-1 will be steered in a manner conventional to CML gates as logic elements.

Node D is further connected to ground through a resistor R1 and to the base of transistor Q3 of the voltage level shifter 18. The collector of transistor Q3 is connected to ground and to a 50 ohm resistor R1 on the side of the resistor opposite node D, while the emitter of transistor Q3 of voltage level shifter 18 is connected to a second resistor R2 of 315 ohms and to a regulated current source I-2. Resistor R2 on the side opposite the emitter of transistor Q3 is also connected at node C to the base of transistor Q4 of the comparator gate 14. The emitter of transistor Q4 is connected in common to the emitter of transistor Q5 and to a third regulated current source I-3 so that the current from I-3 will be steered through either transistor Q4 or Q5 in the conventional CML gate current steering relationship. The collector of transistor Q4 is connected to node J and to ground through resistor R4, while the collector of transistor Q5 is connected to node K and to ground through resistor R5. Nodes J and K are connected through a pair of gates 24 and 26, respectively, and thence to node Z. The purpose of the gates 24 and 26 is to increase the gain of the output of the comparator 14 at nodes J and K to a suitably high voltage level.

DATA RECEIVE node R is connected to ground through a 50 ohm resistor R5 and in common to the base of transistor Q6 of the second voltage level shifter 19 through a resistor R6 of 425 ohms. The collector of transistor Q6 is connected to ground, while its emitter is connected to a fourth regulated current source I-4 and to the base of transistor Q5 of the comparator gate 14.

Both DATA RECEIVE node R and DATA SEND node DS are connected to CML gates 20 and 22 so as to compensate for the logical level swings at node DS and those being received concurrently at node R. Thus, the node DS is connected first to the base of transistor Q7 of the CML gate 20, while the collector of the second transistor Q8 is connected at node E between the base of transistor Q6 of the voltage level shifter 19 and resistor R6. The emitters of transistors Q7 and Q8 are connected in common to a fifth regulated current source I-5, while the collector of transistor Q7 is connected to ground, and the base of transistor Q8 is connected to a threshold voltage source VTH. The value of the voltage at VTH (−200 mV) is selected substantially midway of the voltage swing of the DATA SEND logical levels to steer the current from source I-5 through the gate 20 in the conventional manner.

The second gate 22 comprising transistors Q9 and Q10 have their emitters connected in common to a sixth regulated current source I-6 in current steering relationship. The collector of transistor Q9 is connected to ground, while the collector of transistor Q10 is connected directly to node R, while the base of transistor Q9 is connected to a threshold voltage source (−200 mV), selected midway between the voltage swings on the base of transistor Q10 by the data being received at the DATA SEND node. Thus, current from source I-6 will be steered through the gate 22 in the conventional manner.

Now as to the operation of the circuit of the driver/receiver module A, it should be understood that there are four different combinations, or logical level situations, being handled by this circuit. The first is when DATA SEND is HIGH and DATA RECEIVE is HIGH; the second case is when DATA SEND is HIGH and DATA RECEIVE is LOW; and the third case is DATA SEND is LOW and DATA RECEIVE is HIGH; while the last case is where DATA SEND is LOW and DATA RECEIVE is LOW.

Also, in connection with these four logic level situations, as hereinabove mentioned, the voltage levels at nodes D and R may be degraded from the desired CML levels of 0.0 V to −400 mV, representing the logical HIGHs and LOWs, due to the resistance in the transmission lines, to differential noise, to process variations in the manufacture of the modules as well as variations in voltage supplied by the voltage supply. As to transmission line resistance, the disclosed circuit is capable of driving up to 3 ohms of transmission line resistance, utilizing the disclosed current level from current source I-1 supplying current to node D and module B of 16 mA divided by 2, or 3 ohms times 8 mA equals 25 mV line loss in a signal arriving at node R, module B.

Note that all regulated current sources I-1 to I-6 being on the same module and connected to the same voltage supply can vary from I typical ±25% as an I maximum/minimum.

Also considering a differential noise of ±75 mV, a logical HIGH at node R may be as low as −115 mV (normal variation of −40 mV plus the loss due to differential noise of −75 mV), while the logical LOW can be degraded to a high of −200 mV due to transmission line resistance variations and to the process variation in the manufacture of the modules and the voltage supply variation to the modules and by differential noise.

Taking first the situation where DATA SEND is HIGH and DATA RECEIVE is HIGH and under worst case conditions where the current source in module A is 25% higher than normal (I typical) and the current source in module B is 25% less than normal (I typical) due to process and power supply variations, the voltage on the node DS will be the normal CML voltage level of 0.0 V (or possibly −40 mV) so that the transistor Q2 of CML gate 16 is OFF rendering node D at −94 mV due to resistor R1 and the input voltagge at node R as will be further explained later. With node D at −94 mV, the voltage at node C below the voltage level shifter 18 will be −1091 mV (Vbe of transistor Q3 of −800 mV plus the 315 ohms of resistor R2 times 0.5 mA from current source I-2). The values of the current from source I-2 is such that transistor Q3 is always ON. Thus, the base voltage on transistor Q4 of the comparator 14 is −1091 mV. As to node R, although both DATA SEND and DATA RECEIVE are HIGH, differential noise on the transmission line can degrade the signal as much as 75 mV. Thus, the worst case actual signal arriving at node R would be −231 mV. (The node D of module B would be at −156 mV for a DATA SEND of HIGH, the same as node D on module A, and thus a 156 mV signal degraded by 75 mV differential noise equals −231 mV.)

Now, as to the DATA RECEIVE signal on comparator 14, the operation of gates 20 and 22 must now be considered. Since node DS is also connected to transistor Q7 of gate 20 and transistor Q10 of gate 22 and with a voltage of 0.0 at the bases of these transistors, transistor Q7 is ON and transistor Q8 is OFF, and likewise transistor Q10 is ON and transistor Q9 is OFF so that 5 mA of current from source I-6 is drawn from node R through the 50 ohm resistor R5. However, the 50 ohm resistor R5 is connected in parallel with a similar 50 ohm resistor in module B which corresponds to the 50 ohm resistor R1 connected to node D of module A. Thus, with two 50 ohm resistors connected in parallel, the total resistive load is 25 ohms, and thus the voltage at R is the −231 mV and the voltage on D is −94 mV as stated above. Since there is no current flowing through transistor Q8, there is no voltage drop across resistor R6, so that the voltage at the base of Q6 is −231 mV and the voltage at node F is −1031 mV due to the voltage drop of 800 mV, the Vbe of transistor Q6. The current of current source I-4 is selected so that transistor Q6 is always ON. Thus, the base voltage of transistor Q5 of the comparator is higher (−1031 mV > −1091 mV) on transistor Q4 so that current flows through transistor Q5 causing the voltage level at node K to be lower than the voltage level at node J so that the output from node Z is at a logical HIGH corresponding to the logical HIGH received at node R.

In the next situation where DATA SEND is HIGH and DATA RECEIVE is LOW, and under worst case conditions where the current source in module A is 25% higher than normal and the current source in module B is 25% less than normal, again, transistor Q10 of CML gate 22 will draw current from resistor R5 through node R while transistor Q8 of gate 20 will again be OFF. With DATA SEND of module B being LOW, while DATA SEND of module A is still HIGH, transistor Q2 of gate 16 is OFF, so the voltage at node D is at −40 mV and the voltage at node C and the base of transistor Q4 of the comparator gate 14 is −1037 mV, the voltage drop across the voltage level shifter 18. On DATA RECEIVE node R the voltage is −356 mV, which comprises the worst case voltage situation for DATA RECEIVE LOW, which comprises the 156 mV due to transistor Q10 being ON, and differential noise of −75 mV plus line resistance of −25 mV. Again, with transistor Q8 of gate 20 being OFF, there is no voltage drop across resistor R6 so the voltage at node E, including the voltage drop through transistor Q6, is −1156 mV since the voltage on transistor Q4 is higher than the voltage on the base of transistor Q5, current flows through transistor Q4 dropping the voltage level on node J below the voltage level on node K. Thus, the output from nodes Z will be a logical LOW corresponding to the logical LOW received at node R.

Now as to the third situation where both DATA SEND and DATA RECEIVE are low, and again under worst case conditions where the current source in module A is 25% higher than normal and the current source in module B is 25% lower than normal, with DATA SEND being LOW, transistor Q10 of gate 22 is now OFF and current from current source I-6 is now steered through transistor Q9 to ground. On the other hand, with the base of transistor Q7 now being lower (−400 mV) than the voltage on the base of transistor Q8, current now flows through transistor Q8 causing a voltage drop across transistor R6. Under these conditions, again, a logical level LOW can vary from −500 to −300 mV, assuming the worst case conditions, the voltage level at D will be −500 mV placing a −1497 mV on the base of transistor Q4 of the comparator gate 14 taking into consideration the voltage drop across the voltage level shifter 18. Again, assuming a worst case condition for DATA RECEIVE also LOW of −300 mV less the differential noise of 75 mV and the drop of 25 mV due to transmission line resistance, the voltage level at node R is −200 mV. Again taking into consideration the voltage drop across resistor R6 of 562 mV and the voltage drop across transistor Q6, the voltage at node E and the base of Q5 of the comparator 14 is −1562 mV. With the voltage on the base of Q4 being higher than the voltage on the base of transistor Q5 of the comparator gate, transistor Q4 is ON dropping the voltage level at node J lower than the voltage level at node K so that the output from node Z will be a logical LOW corresponding to the logical LOW received at node R.

Finally, taking the situation where DATA SEND is LOW and DATA RECEIVE is HIGH and with the worst case conditions where the current sources of both modules A and B are 25% less than normal, again, transistor Q8 of gate 20 will be ON and transistor Q10 of gate 22 will be OFF so that the voltage drop across resistor R6 must be taken into consideration. Since DATA SEND is LOW in this case and transistor Q2 of gate 16 is ON, voltage at node D is −300 mV placing a −1312 mV on the base of transistor Q4 of the comparator gate 14 when the voltage drop across the voltage level shifter is taken into consideration. At node R the signal is −115 mV instead of the normal current mode logic level of 0.0 V due to differential noise so that the voltage level at the base of transistor Q5 is −1252 mV taking into consideration the voltage drop across resistor R6 and transistor Q6 of the voltage level shifter 18. With the voltage on the base of transistor Q4 being lower than the voltage level on transistor Q5, transistor Q5 is ON lowering the voltage at node K while the voltage at node J remains HIGH so that the output from node Z is at a logical HIGH corresponding to the logical HIGH being received at node R.

Thus, in summary, it is realized that the duplex-/driver receiver modules comprising this invention tolerates differential noise, errors induced by process variations which can cause resistance values, power supply voltages and current source values to vary as much as 25%, yet the voltages at nodes C and F will reflect true HIGHs and LOWs corresponding to the logical HIGHs and LOWs of values varying from normal at nodes DS and R. In short, this invention can tolerate I max/min of ±25%, ±25 mV of differential noise, and up to 3.0 ohms of transmission line resistance, yet drive and receive concurrently.

What is claimed is:

1. A duplex driver/receiver module having circuitry capable of sending signals of different voltage levels representing logical HIGHs and LOWs to an identical module and concurrently receiving signals of different voltage levels representing logical HIGHS and LOWS from said identical module via two conductors connecting said modules comprising:

means for receiving digital signals from another source.

means including a driving node connected to said identical module by one of said conductors for sending signals corresponding to the digital signals received from said another source to said identical module, means including a receiving node connected to said identical module by another of said conductors for receiving signals from said identical module, output means, means including comparator means for comparing the voltage levels of said signals sent from said driving node with the voltage levels of said signals currently being received on said receiving node and for sending signals from said module via said output means corresponding to the signals representing logical HIGHs and LOWs received at said receiving node, and means coupled to said means for receiving signals from another source and coupled to said receiving node for modifying the signals received at said receiving node by changing the voltage levels of said received signals according to their intended logical representations before reaching the comparator to enable the comparator means to distinguish between signals whose voltage levels may have been varied due to module manufacturing tolerances, differential noise, etc., and currently being received and those signals being sent from said driving node.

2. A duplex driver/receiver module as claimed in claim 1 wherein said means including a driving node for sending signals to said identical module comprises a current switch connected to a first current source, said current switch being connected between said driving node and said means for receiving digital signals from another source.

3. A duplex driver/receiver module as claimed in claim 2 wherein said means including a comparator means comprises a second current switch connected to a second current source, said current switch being coupled to the driving node and to said receiving node.

4. A duplex driver/receiver module as claimed in claim 3 wherein said means for modifying the signals received at said receiving node comprises a pair of current switches each connected to separate current sources, said separate current sources being different from said first and second current sources,
 one of said current switches being coupled directly to said receiving node,
 the other current switch being coupled to said receiving node through a resistance means,
 said current switches being connected to said means for receiving digital signals from another source to alternately draw current from said receiving node directly to said current source or through said resistance means to said current source depending on the voltage level of the signals received at said means for receiving signals from another source.

5. A duplex driver/receiver module as claimed in claim 1 wherein said means including a driving node for sending signals received from another source to said identical module comprises gating means including first and second transistors with the emitters of said transistors connected to a current source in current switching relationship and with the base of the first transistor connected to the means for receiving digital signals from another source and the base of the other transistor connected to a voltage reference of a voltage level selected to be between the different voltage levels of the digital signals from said other source, said driving node being connected to the collector of said second transistor.

6. The duplex driver/receiver module as claimed in claim 5 wherein said means including comparator means comprises a second gating means including second and third transistors connected to a current source in current steering relationship with the base of the third transistor coupled to the driving node and the base of the fourth transistor coupled to said receiving node and with the collectors of both said transistors being connected to said output means to alternately send signals to said output means depending upon the voltage levels applied to the bases of the third and fourth transistors.

7. The duplex driver/receiver module as claimed in claim 6 wherein said means for modifying the signals received at said receiving node comprises third and fourth gating means, said third gating means comprising fifth and sixth transistors and said fifth gating means comprising seventh and eight transistors, the transistors of said third gating means being connected to a current source of one current level in current steering relationship and the transistors of the fifth gating means being connected to a current source of another current level,
 the base of the fifth transistor being connected to the means for receiving digital signals from another source and to the base of the eighth transistor, the bases of the sixth transistor and the seventh transistor being connected to a reference voltage selected to be substantially midway between the voltage swings of the digital signals received from another source so that the currents from the respective current sources of gates three and four are alternately passed through alternate transistors thereon,
 resistance means connected between said receiving node and the comparator means,
 the collector of the sixth transistor being connected between said resistor and said comparator means and the collector of the eighth transistor being connected to said receiving node to alternately enable and disable the resistance means from the signal received at the receiving node as received at the comparator means.

8. The module as claimed in claim 7 further including voltage level shifting means between said driving node and said comparator means for changing the voltage levels of the signals being sent from said driving node to different levels at said comparator means, and voltage level shifting means between said receiving node and said comparator for changing the voltage levels of the signals being received at said receiving node to different levels at said comparator means.

* * * * *